United States Patent [19]
Lambregts

[11] Patent Number: 6,062,513
[45] Date of Patent: May 16, 2000

[54] TOTAL ENERGY BASED FLIGHT CONTROL SYSTEM

[75] Inventor: Antonius A. Lambregts, Bellevue, Wash.

[73] Assignee: The Boeing Company, Seattle, Wash.

[21] Appl. No.: 09/152,732

[22] Filed: Sep. 14, 1998

[51] Int. Cl.[7] .................................................. B64C 13/18
[52] U.S. Cl. ........................ 244/175; 244/182; 244/191; 244/181; 701/3; 701/4
[58] Field of Search ................................ 244/76 R, 175, 244/182, 191, 181, 194, 195; 701/3, 4

[56] References Cited

U.S. PATENT DOCUMENTS

| | | | |
|---|---|---|---|
| 3,578,270 | 5/1971 | Ellis | 244/843 |
| 4,109,886 | 8/1978 | Tribken et al. | 244/178 |
| 4,236,685 | 12/1980 | Kissel | 244/223 |
| 4,373,184 | 2/1983 | Lambregts | 244/196 |
| 4,527,242 | 7/1985 | McElreath et al. | 244/196 |
| 4,536,843 | 8/1985 | Lambregts | 244/181 |
| 4,905,934 | 3/1990 | Chin | 244/191 |
| 5,000,404 | 3/1991 | Martorella | 244/188 |
| 5,016,177 | 5/1991 | Lambregts | 364/424.06 |
| 5,079,711 | 1/1992 | Lambregts et al. | 244/181 |
| 5,197,697 | 3/1993 | Lyloc et al. | 244/197 |
| 5,255,880 | 10/1993 | Lyloc et al. | 244/197 |
| 5,365,446 | 11/1994 | Farineau et al. | 244/182 |
| 5,386,954 | 2/1995 | Bissey et al. | 244/182 |
| 5,722,620 | 3/1998 | Najmabadi et al. | 244/191 |

*Primary Examiner*—J. Woodrow Eldred
*Attorney, Agent, or Firm*—Christensen O'Connor Johnson & Kindness PLLC

[57] ABSTRACT

In a method of flight control in which a thrust command is computed based on the total aircraft energy error relative to flight path and speed control commands, and an elevator command is computed based on the energy distribution error relative to the same flight path and speed control commands, an improvement is provided including an elevator control command in response to a column control input by the pilot. In the short term, the computing establishes a change in flight path angle beyond the sustainable flight path angle at the trim speed for the prevailing thrust condition. In the long term, the computing establishes a change in speed relative to a set reference speed, the speed change being proportional to the column control input. In the long term, the computing establishes a flight path angle equal to a sustainable value for the prevailing thrust condition and the altered speed condition.

18 Claims, 5 Drawing Sheets

TECS FUNCTION ARCHITECURE

TOTAL ENERGY BASED FLIGHT CONTROL SYSTEM

FIELD OF THE INVENTION

This invention relates to automatic aircraft flight control, and more particularly, to improvements in an integrated longitudinal flight control system based on total aircraft energy.

BACKGROUND OF THE INVENTION

Numerous autopilot, autothrottle, and flight guidance systems for use in aircraft flight control have been developed in the prior art. Such systems have often evolved in a piecemeal fashion. Particularly with respect to longitudinal axis flight control, such automatic control systems are characterized by a proliferation of control laws and hardware components. The same is true for computer-augmented manual control systems (often referred to as fly-by-wire control systems.) As a result, these systems are overly complex and lacking in functional integration. This has caused numerous operational and performance drawbacks.

In response to this situation, a fully integrated vertical flight path and speed control system was developed and is described in U.S. Pat. No. 4,536,843, incorporated herein by reference. This system is termed a Total Energy Control System (hereinafter referred to as "TECS" or "TEC system".) The TEC system develops fundamental solutions to the problem of coordinated elevator and throttle control to produce performance levels exceeding those generally known in the flight control system's art. TECS provides functionally integrated control for all autopilot and flight management system modes, as well as for computer-augmented manual control modes.

The basic design philosophy of a TEC system is to compute an aircraft's total energy state and its desired energy state, as represented by flight path, speed and their associated targets. The TEC system controls the total energy error with thrust, while using the elevator to control the energy distribution error between the flight path and speed. For all flight conditions, thrust is the most effective means to change the aircraft's energy state, whereas elevator control provides an effective means to modulate energy distribution and stabilize the aircraft's attitude.

In more detail, should a pilot want to change from a present flight path angle $\gamma$ to a commanded flight path angle $\gamma_C$ and/or to change the longitudinal acceleration from a present value $\dot{V}$ to a commanded value $\dot{V}_C$, the engine throttles may be driven until the total specific energy rate error, $\dot{E}_{s\varepsilon}$, relative to the combined target flight path angle and longitudinal acceleration is zero.

$$\dot{E}_{s\varepsilon} = \gamma_\varepsilon + \frac{\dot{V}_\varepsilon}{g} \tag{1}$$

where, $$\dot{V}_\varepsilon = \dot{V}_C - \dot{V} \tag{2}$$

$$\gamma_\varepsilon = \gamma_C - \gamma \tag{3}$$

The signal $\dot{V}_\varepsilon/g$ is the longitudinal acceleration error signal normalized by the gravitational acceleration constant g.

Likewise, the elevator surfaces are re-positioned until the energy rate distribution error, $\dot{D}_\varepsilon$, representing the difference between the flight path angle error and the longitudinal acceleration error, is zero.

$$\dot{D}_\varepsilon = -\gamma_\varepsilon + \frac{\dot{V}_\varepsilon}{g} \tag{4}$$

The TECS control concept has been shown to work effectively in various speed and flight path control modes for a multitude of flight conditions.

FIG. 1 shows the general functional architecture of the Total Energy Control System. The Flight Control Computer (FCC) depicts the major subfunctions of the TECS processing algorithm. The FCC receives data inputs from an Inertial Reference Unit (IRU), an Air Data Computer (ADC), a Mode Control Panel (MCP), and a Flight Management Computer (FMC). The ADC and IRU provide sensor information on the airplane states and dynamics, such as airspeed, altitude, vehicle accelerations, angular rates, attitudes, and aircraft latitude and longitude position. The MCP provides engagement and disengagement control of the various automatic and computer augmented manual control modes, as well as means to select and display the control reference commands for the tactical automatic flight control modes. The MCP is generally mounted in the center of the cockpit glareshield. The FMC provides the control reference commands for strategic (preprogrammed) flight control modes, often called VNAV (for vertical navigation), LNAV (for longitudinal navigation), and VPROF (for speed profile). For these strategic modes, the vertical and horizontal flight paths and speed profile are programmed as a function of aircraft latitude and longtitude, or in the case of the speed profile mode, as a funtion of altitude in the FMC via the Control Display Unit (CDU).

The control algorithm in the FCC is subdivided into the following main parts, shown as blocks labeled Path Modes Feedback Normalization, Speed Modes Feedback Normalization, Commands Coordination, and Control Column Command Processing. In the Path Modes Feedback Normalization block, the path mode error for any selected vertical flight path control mode is normalized into a flight path angle command signal $\gamma_C$ which is passed on to the block labeled Commands Coordination. Likewise, in the Speed Modes Feedback Normalization block, a speed error for the selected speed mode is normalized to form the longitudianl acceleration command.

In the Commands Coordination block, the energy rate related flight path angle and longitudinal acceleration commands are processed into a specific net thrust command and pitch innerloop control command. The Control Column Command Processing block receives a signal that is sensed from pilot movement of the control column or stick. The Control Column Command Processing block processes this signal to form the commands which are passed on to the Commands Coordination block to shape the airplane flight path angle and pitch attitude responses for the computer augmented manual mode (sometimes referred to as a "fly-by-wire" mode) to provide optimum handling qualities.

The block Thrust Scaling scales the specific thrust command to the actual aircraft weight and the number of operating engines to form the individual Net Thrust Commands to each engine. The block Pitch Innerloop provides the short period pitch attitude stabilization for the aircraft. The engine thrust may be controlled manually by the pilot using the throttles, or automatically by the FCC.

Referring to FIG. 2, block 38 illustrates the basic circuitry for realizing the above-described TECS control concept.

Commanded flight path angle signal $\gamma_C$ is applied as one input to a combiner 12. The aircraft's actual or current flight path angle signal $\gamma$ is also inputted to combiner 12. The combiner 12 outputs a flight path error signal $\gamma_\epsilon$ equal to the difference between the commanded and actual flight path angles.

Similarly, the aircraft's actual or current longitudinal acceleration signal $\dot{V}$ is subtracted from the commanded longitudinal acceleration $\dot{V}_C$ in a combiner 14. The resulting combiner 14 output is the longitudinal acceleration error signal $\dot{V}_\epsilon$. An amplifier 16 multiplies the $\dot{V}_\epsilon$ error by a fixed gain $$\frac{1}{g},$$

producing a non-dimensionalized output signal $\dot{V}_\epsilon/g$ which is provided as inputs to combiners 18 and 20. Also coupled as inputs to combiners 18 and 20 is the signal $\gamma_\epsilon$. The output signal from combiner 20 is the addition of these quantities to form $\dot{E}_{S\epsilon}=\gamma_\epsilon+\dot{V}_\epsilon/g$, which is the above-stated total energy rate error. The output signal from combiner 18 is the difference of these quantities to form $\dot{D}_\epsilon=-\gamma_\epsilon+\dot{V}_\epsilon/g$, which is the above-stated energy rate distribution error.

The specific energy rate error signal $\dot{E}_{S\epsilon}$ is applied to thrust command computation circuitry 22 which generates a thrust command signal $\delta_{THRUST_C}$. The thrust command signal $\delta_{THRUST_C}$ is used to control engine thrust at block 24, and is calculated to reduce the specific energy rate error signal $\dot{E}_{S\epsilon}$ to zero. In a similar manner, the energy rate distribution error signal $\dot{D}_\epsilon$ is fed to elevator command computation circuitry 26, which responds by producing an elevator control command signal $\delta_{ELEVATOR_C}$. This signal, when applied to the aircraft's elevator at block 24, works to drive the energy rate distribution error signal $\dot{D}_\epsilon$ to zero in harmony with the control of $\dot{E}_{S\epsilon}$. In the above manner, the aircraft is precisely guided from its present flight path angle and longitudinal acceleration to the flight path angle and longitudinal acceleration having the least amount of energy error and distribution error.

Frequently, it is desired to control the aircraft to altitude and speed targets rather than to flight path angle and longitudinal acceleration targets. In that case, a simple process may be used to normalize the command and feedback signals of the selected flight path and speed mode into the standard $\gamma_C$ and $\dot{V}_C$ signals. (This normalization is shown in FIG. 3.) The air speed error $V_\epsilon$ is multiplied by a suitable gain $K_V$ to form the longitudinal acceleration command:

$$\dot{V}_C = K_V V_\epsilon \tag{5}$$

where, $$V_\epsilon = V_C - V \tag{6}$$

$$\dot{V}_\epsilon = \dot{V}_C - \hat{\dot{V}} \tag{7}$$

with V being the current airspeed, $V_C$ being the commanded airspeed, $\hat{\dot{V}}$ being the current longitudinal acceleration, and $\dot{V}_C$ being the commanded longitudinal acceleration.

The altitude error is multiplied by a suitable gain factor $K_h$ to form the vertical speed command $\dot{h}_C=K_h h_\epsilon$. The gain $K_h$ is selected equal to $K_V$ to yield identical altitude and speed dynamics. Subsequently, the vertical speed command is divided by the aircraft's speed V to form the flight path angle command:

$$\gamma_c = \frac{\dot{h}_c}{V} = \frac{K_h h_\epsilon}{V} \tag{8}$$

and $$\gamma_\epsilon = \frac{K_h h_\epsilon}{V} - \gamma \tag{9}$$

The altitude and speed errors are thus scaled in correct relative energy terms. Given the above signal normalization, the flight path angle and longitudinal acceleration commands can be developed for each of the standard longitudinal autopilot and autothrottle modes to couple into the generalized total energy based thrust and elevator command processors.

Referrring back to FIG. 2, the computer-augmented manual control mode of known TECS is provided by processing the signal $\delta_C$ representative of the pilot's control column or sidestick input to form the flight path angle command signal $\gamma_{C_{MAN}}$. The term $\gamma_{C_{MAN}}$ is shown as an input to combiner 12 in FIG. 2. Conceptually, the pilot's input processing module for the computer-augmented manual control mode is shown in FIG. 1 and labeled "command processing." This command processing module also produces other signals that are used to precisely shape the control responses to achieve optimum handling qualities throughout the flight envelope.

The above-described TECS system, however, does not yet include all the desired functionality. One such function has to do with envelope safeguarding and speed stability when thrust is limited to its upper or lower limit.

As background information, conventional unaugmented airplane controls do not typically include explicit envelope safeguarding function, such as angle of attack limiting. Therefore, full column push or pull can result in overspeed or stall conditions. That is why regulatory authorities include regulations explicitly written to ensure adequate safety in aircraft design. United States regulations require the presence of a natural or synthetic stall warning device and a demonstration that the airplane is, in fact, speed stable. Speed stability means that when the airplane is trimmed for a certain speed and the airplane is subsequently maneuvered (pitched) at constant thrust in a manner that causes a departure from the trim speed, the airplane will naturally return to its trim speed after the column (or applicable pitch controller) is released.

For computer-augmented control systems that have neutral or negative static speed stability, the above regulatory requirement is met by a demonstration of "equivalent" safety, achieved by the addition of mode functions intended to limit angle of attack to a particular value or to limit speed to a minimum value $V_{MIN}$, as well as to a maximum value $V_{MAX}$. These limits are shown in FIG. 2 at box 34 and are used to override the speed and energy distribution signals at switches 32 and 36, respectively.

The issue of speed stability arises in the TECS context as follows. As stated above, the TEC system controls the total energy error with thrust, while the energy distribution error is controlled with the elevator. While in the fully automatic modes (i.e., Flight Management System, or autopilot with autothrottle) using the basic TEC system, the pilot selects a speed mode and associated speed target, as well as a flight path mode and an associated flight path target. The selection of target speed and target flight path can cause the thrust to increase (or decrease) to its maximum thrust limit (or idle thrust limit.) When this happens, there is only one controller left (the elevator) and therefore only one of the control targets can then be satisfied directly. For such conditions, which are usually of short duration, a priority selection must be made as to which control target should be satisfied first—flight path or speed. This priority selection is called "control priority" and for many automatic mode combinations, it is most appropriate to select a "speed control priority."

Referring to FIG. 2, speed control priority by use of the elevator only is achieved by opening switch 28. This action disconnects the flight path angle error signal $\gamma_\epsilon$ from the elevator command computation so it will not interfere with attaining or maintaining the target airspeed. This allows the TEC system to continue using the elevator to control to a particular airspeed target, while the flight path angle is temporarily left to respond in an open-loop fashion.

For some modes (e.g., the computer-augmented manual control mode and the ILS Glide Slope mode), a flight path control priority is used when the command thrust reaches its upper or lower limit. In this case, the basic TEC system opens a switch, labeled 30 in FIG. 2, to eliminate the acceleration error term from the elevator command computation. This allows the TEC system to continue using the elevator to control to a particular target flight path, while temporarily letting the speed respond in an open-loop fashion.

Relating the above situations to the TECS computer-augmented manual control mode, the TEC system will control to both flight path and speed targets as long as the thrust command stays within the minimum and maximum thrust limits. In that case, there is no speed stability issue because speed will be maintained automatically. Should the thrust command reach a limit, then the switch 30 is opened and the airspeed is allowed to decrease (or increase) until the flight path angle is satisfied or a speed limit is reached, whichever occurs first. Thus, for the TECS computer-augmented manual control mode, provides full freedom to manually control the flight path angle and will only constrain the flight path control to ensure the selected speed limits are not exceeded, after thrust has reached a command limit.

The above-described TEC system provides safety with regard to speed that is at least as good as that provided by classical airplanes having positive speed stability in combination with some type of stall warning device. The above-described TEC system also produces satisfactory handling qualities for most flight conditions.

There is, however, one flight condition in which this control strategy may not produce optimum handling qualities. For example, during manual mode flight after takeoff, it is usual for the pilot to want to establish the aircraft's a flight path angle consistent with the set limit thrust, while establishing and maintaining a target climb-out speed. For this case, path control priority allows good control over flight path, but it may be difficult for the pilot to establish the exact flight path angle command consistent with the target climb-out speed and, if established, to maintain that speed, since for this condition speed is not being directly controlled. This is particularly the case if the airspeed has a tendency to diverge. The result is that the pilot will need to manipulate the flight path angle target more frequently than desired in order to indirectly control to the target speed.

The problem may be better understood considering the following. After establishing the correct inertial flight path with thrust at the upper limit and speed at the target speed, the speed may subsequently start to drift off due the aforementioned lack of speed stability, or due to the effect of a wind change, which at constant inertial flight path angle, will change the flight path angle with respect to the air mass and thus will affect the longitudinal acceleration. Also, the change in net thrust due to change in altitude may cause the pilot to repeatedly change his flight path angle command in order to maintain speed at the target value. This is both difficult and workload intensive.

Thus, when flying in the computer-augmented manual control mode of the TEC system, a need exists for reduction of the pilot workload during thrust-limited conditions or auto thrust disengaged conditions in a TEC system, especially during the task of establishing and maintaining a speed target during climb-out at constant thrust. The present invention is directed to fulfilling this need.

SUMMARY OF THE INVENTION

In a method of flight control in which a thrust command is computed based on the total aircraft energy error relative to flight path and speed control commands, and an elevator command is computed based on the energy distribution error relative to the same flight path and speed control commands, an improvement is provided including an elevator control command in response to a column control input by the pilot. In the short term, the computing establishes a change in flight path angle beyond the sustainable flight path angle at the trim speed for the prevailing thrust condition. In the long term, the computing establishes a change in speed relative to a set reference speed, the speed change being proportional to the column control input. In the long term, the computing establishes a flight path angle equal to a sustainable value for the prevailing thrust condition and the altered speed condition.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The present invention modifies the known TEC system by using an alternate control strategy and flight path command $\gamma_C$ processing scheme. This alternate strategy is used during manual control mode (using a control column or the like) when the thrust has been driven to a preset value (such as a maximum or minimum thrust limit) or when the automatic throttle is disengaged. Under these circumstances, instead of reverting to a pure path priority scheme for stick or control column inputs (by opening switch 30 and letting the airspeed increase or decreases until a speed limit is reached as is done in the known TEC system), the present invention transitions to a combined speed and path priority scheme, where flight path angle is the short term control priority and the set speed command is the long term priority. In this scheme, switch 30' remains closed and the normal speed control feedback is continued after thrust reaches a limit.

The pilot's control column input is allowed in the short term to develop a proportional flight path angle command, which may initially exceed the sustainable flight path angle (for a given thrust limit.) This is accomplished in the present invention by keeping the switch 30' closed while the augmented manual control mode is engaged, causing the speed error to continue to feed into the control system. When thrust is between $T_{MIN}$ and $T_{MAX}$ limits, speed will be maintained closely, even while manually commanding a change in flight path angle through the control column. For large changes in the commanded flight path angle, however, thrust will reach a limit. Once thrust is limited, the elevator is used short term to control the commanded flight path angle even if it is in excess of the limit sustainable flight path angle.

In the long term, though, the control column input is allowed to command only a long term sustainable flight path angle commensurate with a proportional speed deviation $\Delta V$ from the selected speed command, with the flight path angle establishing itself at the limit sustainable flight path angle for that thrust condition and final speed. Stated differently, in the long term the elevator is used to control speed to a value equal to $V_C$ plus $\Delta V$, where $\Delta V$ is proportional to the magnitude of the column input. Thus after thrust reaches a limit, the greater the sustained control column input, then the greater the initial flight path angle change and the greater the final speed deviation from the commanded speed.

When the pilot returns his or her control column input to zero, the system of the present invention will bring the actual speed back to the commanded speed $V_C$ (i.e., $\Delta V$ will become zero) and will establish the sustainable flight path angle for the selected speed command and limited thrust condition. Thus, while the thrust is at a limit condition, the classical speed stability is re-established.

Figure 1:
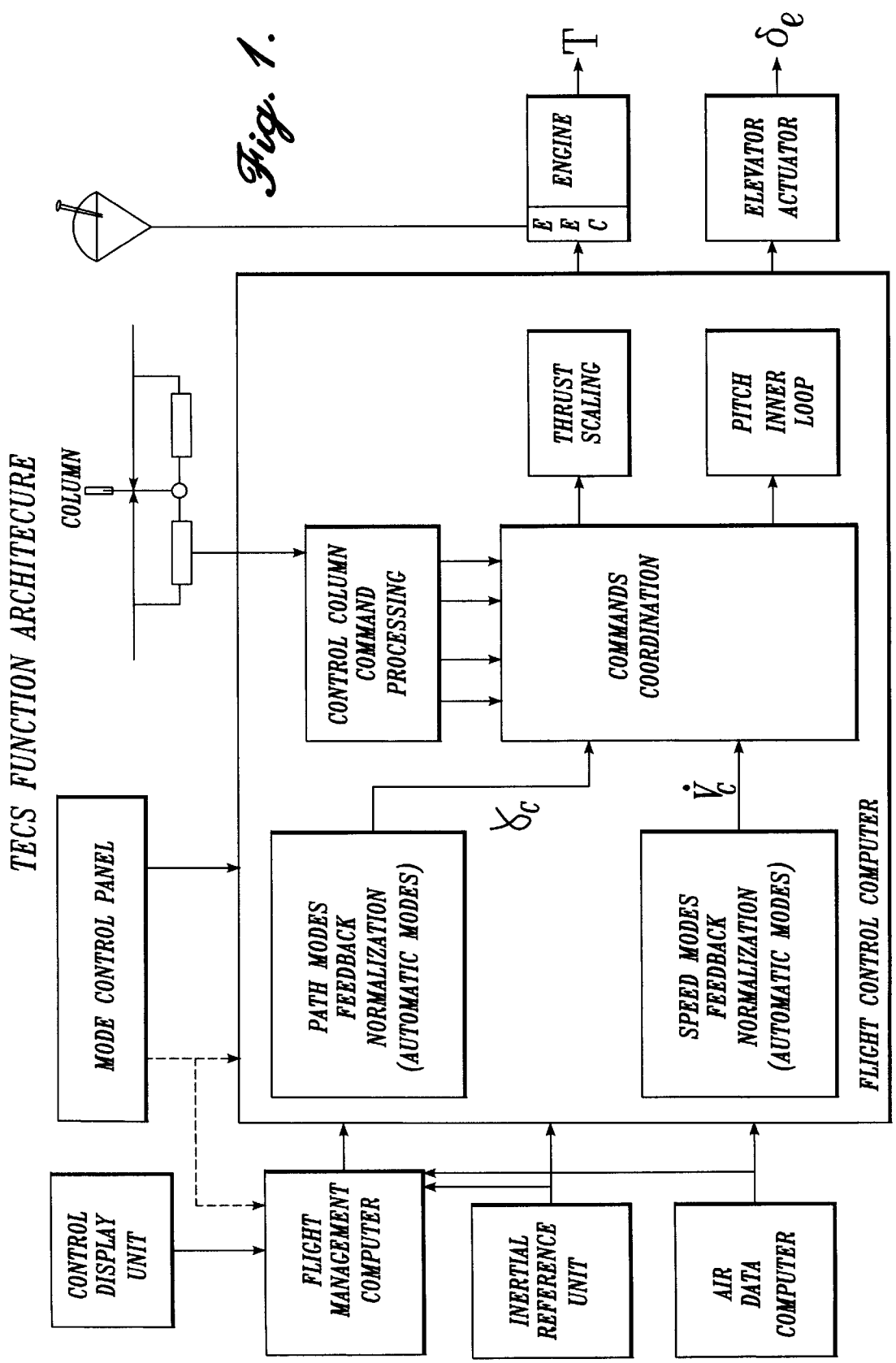
FIG. 1 shows the conceptual TECS functional architecture, including the feed forward command processing module for the computer augmented manual control mode.
Figure 2:
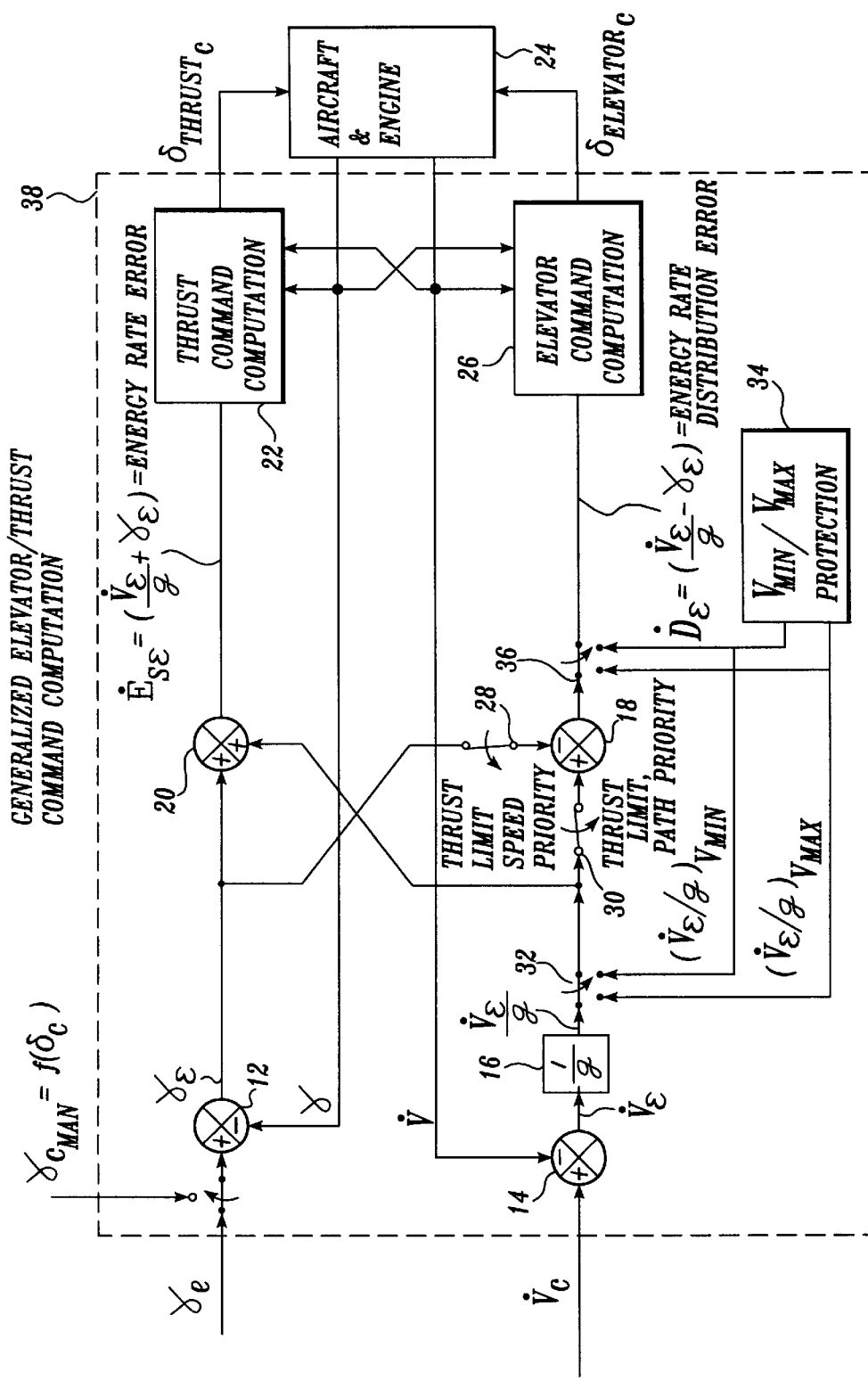
FIG. 2 is a block diagram illustrating the basic control architecture of a known TEC system.
Figure 3:
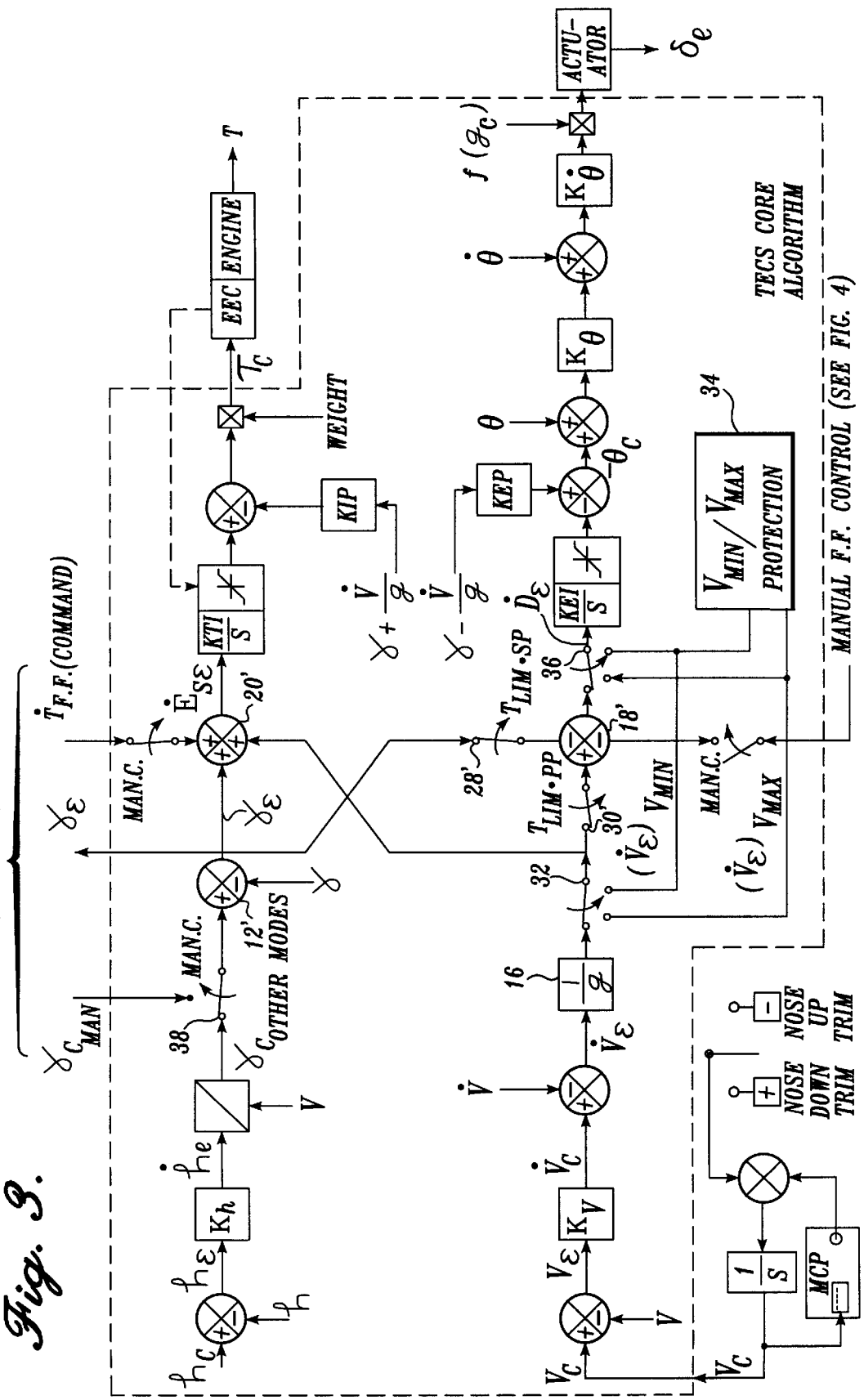
FIG. 3 is a block diagram of a TEC system including the signal interfaces of the feed forward signals due a manual control column or stick input signal, processed in accordance with the present invention.

The speed control function for the augmented manual mode is the same as for the automatic modes, where the speed command can be set through the control knob on the mode control panel (MCP). The pilot is further able to trim the airplane through conventional trim switches while in the augmented manual control mode. Therefore, as shown in FIG. 3, the trim switches on the column are used to provide an alternative means by which to set $V_C$, which is also displayed on the MCP.

Figure 4:
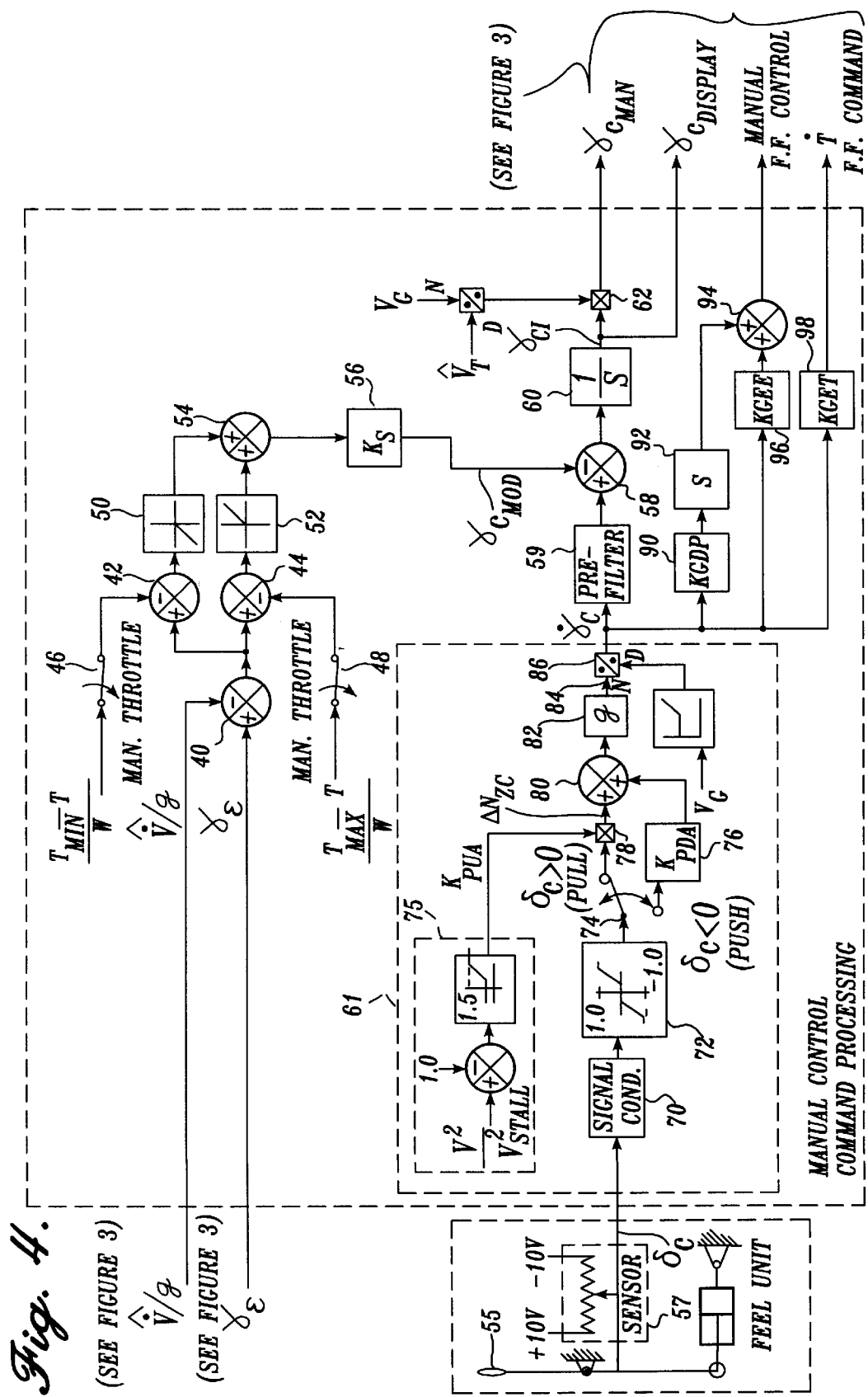
FIG. 4 is a block diagram illustrating a manual control command processing to form feed forward command signals in accordance with the present invention.

A detailed discussion of the present invention combined path/speed priority scheme is provided below in terms of its transfer function development and steady state performance. Following, is a description of one embodiment of the system formed in accordance with the present invention, as shown in FIGS. 3 and 4.

Combined Path/Speed Priority System

Thrust required at constant speed is proportional to flight path angle. Thus, there is only one unique flight path angle that can be sustained at constant thrust at a given speed. Under the prior art TEC system, continued vertical maneuvering after reaching the thrust limits or at constant thrust results in the speed bleeding off or building up. Rather than letting speed temporarily go open loop after the thrust limits are reached, the present invention continues to feed both the flight path angle error signal $\gamma_\epsilon$ and the longitudinal acceleration error $\dot{V}_\epsilon$ into the computation of the energy rate distribution error signal $\dot{D}_\epsilon$ and the elevator command. According to the present invention, the developing speed error is used to counteract the pilot's control column input. To achieve speed stability, it is necessary that when the speed deviation gets large enough it balances out the pilot's input and that the flight path angle establishes itself at the unique sustainable value $\gamma_{MAX}$ for a pitch up command and $\gamma_{MIN}$ for a pitch down command, for the thrust maximum and minimum limits, respectively.

The value of $\gamma_{MAX}$ can be computed from the following performance equation:

$$\gamma_{MAX} = \gamma + \frac{\hat{V}}{g} + \frac{(T_{MAX} - T)}{W} \tag{10}$$

where at a given time $\gamma$ represents the current flight path angle, $\hat{V}/g$ represents the acceleration along flight path which will be equal to a flight path angle change (i.e., the flight path angle change when the current acceleration is reduced to zero), and $(T_{MAX}-T)/W$ represents the flight path angle change obtained from allowing the thrust to change from a current value, T, to the maximum achievable thrust $(T_{MAX})$. The value of $\gamma_{MIN}$ is based on a similar equation using $T_{MIN}$.

If a commanded manual flight path angle $\gamma_{C_{MAN}}$ were to be developed by pure integration of the pilot's control column input signal (as is done in the known TEC system for the augmented manual control mode), then no equilibrium would be established until the speed limit control, $V_{MAX}$ (or $V_{MIN}$), was activated. However, by changing the development of the commanded manual flight path angle $\gamma_{C_{MAN}}$ from a pure integration to a pseudo integration of the control column input signal, with certain other provisions as described below, a more desirable response is achieved.

In the present invention, the amount of pilot-commanded flight path angle control column input that is in excess of the maximum sustainable flight path angle $\gamma_{MAX}$ (at the thrust limit $T_{MAX}$ and on command velocity $V_C$ plus $\Delta V$) is washed out of the flight path angle command over a given period of time.

To realize the desired response during conditions of thrust command limiting, a feedback loop, including separate circuits for maximum thrust conditions (pitch up direction) and minimum thrust conditions (pitch down direction), are formed around a feed-forward flight path angle command integrator (such as the arrangement shown in FIG. 4.) When either circuit closes, the result is a change from the pure integration of the column command into a pseudo-integration with a time constant equal to $1/K_S$. For maximum thrust command conditions, the circuit is arranged to close when the input $\gamma_C - \gamma_{MAX}$ is positive, so when $$\gamma_C > \gamma_{MAX} \tag{11}$$

The minimum thrust command circuit functions in a like manner for the condition $\gamma_C < \gamma_{MIN}$.

The pilot's control column input is provided to the pseudo-integrator in the form of a flight path angle rate command, $\dot{\gamma}_C$, and the overall feed-forward transfer function becomes:

$$\gamma_c = \frac{1}{s}(\dot{\gamma}_c - K_S(\gamma_c - \gamma_{MAX})) \qquad (12)$$

$$\gamma_c = \frac{\dot{\gamma}_c}{s+K_S} + \frac{K_S}{s+K_S}\gamma_{MAX} \qquad (13)$$

Assuming a reasonable value for $K_S$ and engine dynamics, a flight path angle command is initially established that is higher than the sustainable maximum flight path angle at zero acceleration along the flight path for the prevailing thrust, drag, and weight conditions by an amount equal to:

$$((\gamma_c - \gamma_{MAX})|)_{SS} = \frac{\dot{\gamma}_c}{K_S}, \text{ based on equation (13).} \qquad (14)$$

Assuming $T=T_{MAX}$ and combining equations (10) and (14) into equation (3), a flight path angle error $\gamma_\epsilon$ is produced in an amount of:

$$\gamma_\epsilon = \frac{\dot{\gamma}_c}{K_S} + \frac{\hat{V}}{g}, \qquad (15)$$

As will appreciated from viewing equation (15), the steady state value of flight path angle error is not affected by the actual current flight path angle.

The integral action of the elevator control law drives the energy distribution rate error $\dot{D}_\epsilon = \dot{V}_\epsilon/g - \gamma_\epsilon$ to zero. Therefore, after a short time, the flight path angle error is:

$$\gamma_\epsilon = \frac{\dot{V}_\epsilon}{g} \qquad (16)$$

Initially, the aircraft speed error $V_\epsilon$ is zero, since presumably the aircraft was being flown at its commanded speed. Therefore, after a short time, though before a significant speed error develops, the normalized longitudinal acceleration error $\dot{V}_\epsilon/g$ is simply equal to the current normalized longitudinal acceleration value as shown in equation (19) below:

$$\frac{\dot{V}_\epsilon}{g} = \frac{\dot{V}_c}{g} - \frac{\hat{V}}{g} \qquad (17)$$

$$\frac{\dot{V}_c}{g} = K_v\frac{V_\epsilon}{g} \approx 0 \qquad (18)$$

Therefore, $$\frac{\dot{V}_\epsilon}{g} \approx \frac{-\hat{V}}{g} \qquad (19)$$

Combining equations (16) and (19), the short term flight path angle error is:

$$\gamma_\epsilon = \frac{-\hat{V}}{g} \qquad (20)$$

Combining equations (15) and (20) yields:

$$\gamma_\epsilon = \frac{\dot{V}_\epsilon}{g} = -\frac{\hat{V}}{g} = \frac{\dot{\gamma}_c}{K_S} + \frac{\hat{V}}{g} \qquad (21)$$

$$\gamma_\epsilon = -\frac{\hat{V}}{g} = +\frac{\dot{\gamma}_c}{2K_S} \qquad (22)$$

In summary, the elevator control law quickly acts on the flight path angle error by establishing $\dot{D}_\epsilon = \dot{V}_\epsilon/g - \gamma_\epsilon = 0$. This establishes a flight path angle error $\gamma_\epsilon$ equal to $\frac{1}{2}(\dot{\gamma}_C/K_S)$, because the change in longitudinal acceleration error $\dot{V}_\epsilon/g$ is equal and opposite in sign to the change in flight path angle error $\gamma_\epsilon$, thereby in effect equalizing the energy rate errors represented by $\gamma_\epsilon$ and $\dot{V}_\epsilon/g$. Thus, the actual flight path angle of the aircraft tends to stabilize for a constant column input, after thrust reaches the limit.

The excessive flight path angle causes the aircraft speed error to build up long term and, in turn, a corresponding corrective elevator command to develop from the speed error feedback until the acceleration along the flight path goes back to zero and the flight path angle settles at $\gamma_{MAX}$ for a nose up column input command (or at $\gamma_{MIN}$ for a nose down command.) At this point, the elevator control law establishes a new equilibrium in which:

$$\dot{D}_\epsilon = \frac{\dot{V}_\epsilon}{g} - \gamma_\epsilon = 0$$

with the actual normalized longitudinal acceleration settling at $$\frac{\hat{V}}{g} = 0$$

and the commanded longitudinal acceleration $$\frac{\dot{V}_c}{g}$$

(due to the speed error) equaling the flight path angle error.

This may be shown as follows. Equation (15) showed that the steady state flight path angle error $\gamma_\epsilon$ is independent of the actual flight path angle $\gamma$. As a result, the elevator control action will drive $\hat{V}$ to zero. Therefore, combining equations (3), (15), (16), (17), and (18) yields:

$$\frac{\dot{V}_\epsilon}{g} = \gamma_\epsilon = \gamma_c - \gamma = \frac{\dot{\gamma}_c}{K_S} + \frac{\hat{V}}{g} \to \left.\frac{\dot{\gamma}_c}{K_S}\right|_{ss} \text{ and} \qquad (23)$$

$$\frac{\dot{V}_\epsilon}{g} = \left(K_v\frac{V_\epsilon}{g} - \frac{\hat{V}}{g}\right) \to \left.\frac{K_v V_\epsilon}{g}\right|_{ss} \text{ so that} \qquad (24)$$

-continued $$\left(K_V \frac{V_\varepsilon}{g}\bigg|_{SS}\right) = \frac{\dot{\gamma}_c}{K_S}\bigg|_{SS} \quad (25)$$

and, $$\left(\frac{V_\varepsilon}{\dot{\gamma}_c}\right)\bigg|_{ss} = \frac{g}{K_v \cdot K_s} \quad (26)$$

and since $$\dot{\gamma}_c = \frac{\ddot{h}_c}{V_G} = \frac{g\Delta n_{zc}}{V_G} \quad (27)$$

where g is the gravity constant, $\ddot{h}_C$ is vertical acceleration, $\Delta n_Z$ is an incremental load factor, and $V_G$ is ground speed. The final result is:

$$\frac{V_\varepsilon}{\Delta n_{zc}}\bigg|_{ss} = \frac{g^2}{V_G \cdot K_V \cdot K_S} \quad (28)$$

Thus, $K_S$ and $K_V$ determine the speed stability constant in terms of steady state speed bleed off per $\Delta n_Z$ command (or delta column command).

Example Computation

Potential values of the gain may be shown by way of example. Assuming a gain $K_V$=0.1, indicated airspeed $V_{IAS}$=$V_G$=130 knots or 219.4 ft/sec, and $V_{MIN}$=$V_{STALL}$=100 knots, then the stall margin is 1.3($V_{STALL}$)=30 knots or 50.6 ft/sec, while the limit $n_Z$ at maximum lift coefficient ($C_{L,MAX}$) at this speed is:

$$n_z|_{C_{L,MAX}} = \frac{\text{Lift}}{\text{Weight}} = \frac{(1.3 V_{STALL})^2}{(V_{STALL})^2} 1.69$$

and the maneuver margin incremental load factor is:

$$\Delta n_Z = n_{Z_{MAX}} - n_{Z_{STALL}} = 1.69 - 1.0 = 0.69$$

Allowing the speed to bleed off no further than stall speed for a full unity column input (i.e., $\delta_C$=1), the speed stability constant is:

$$\frac{50.6}{0.69} = \frac{32.2^2}{(219.4) \cdot (0.1) \cdot K_s} \quad (29)$$

requiring that $K_S$=0.64. This value of $K_S$ is quite reasonable. From FIG. 4, it can be seen that a full column input will result in a flight path angle rate (and also pitch rate) command of:

$$\dot{\gamma}_c = \frac{(\delta_C)(0.69)(g)}{V_G} \cong 0.1 \text{ radians/sec.}$$

Using equation (14), the result will be a momentary flight path angle command above the maximum sustainable flight path in an amount equal to 0.156 radians or ~9° degrees, resulting in a momentary deceleration command equal to ~3 knots/second and an angle of attack, α approaching $\alpha_{STALL}$ for the flight condition here selected. This maneuver, if sustained, will cause the $V_{MIN}$ protection mode to be invoked, thereby avoiding the danger of a real stall.

Other values of $K_S$ may be selected to obtain the desired speed stability characteristic for different flight conditions. Similarly $K_S$ may be computed to yield the desired speed stability characteristic for the minimum throttle limit condition or for the autothrust-off case, if different. For the latter case, the correction factor for ($T_{max}$–T) and ($T_{min}$–T) in the $\gamma_C$ synchronization loop due to thrust dynamics is not needed and may be switched out, as shown in FIG. 4. Thus, for autothrust-off the effect of the circuits is negated and the synchronization loop around the command integrator is closed any time the pilot wants to establish a flight path angle beyond the sustainable flight path angle.

One Embodiment of a Control System Implementation Formed in Accordance with the Present Invention Referring to FIG. 3, when the augmented manual control mode is engaged, switch 38 passes the signal $\gamma_{C_{MAN}}$ to combiner 12'. Switch 30' remains closed in order to pass the signal representative of longitudinal acceleration error $\dot{V}_\varepsilon/g$ to combiner 18' as an input. Switch 30' opens to provide path control priority for certain automatic modes when thrust is driven to a maximum or minimum limit. For the automatic modes, switch 38 connects the signal labeled $\gamma_{C_{OTHERMODES}}$ through to the combiner 12'. Likewise, during the augmented manual control mode, switch 28' passes the signal representative of flight path angle error term $\gamma_\varepsilon$ to combiner 18' as an input. The flight path angle error term $\gamma_\varepsilon$ is formed as the output of combiner 12' based on the difference between the actual flight path angle γ and the manual commanded flight path angle $\gamma_{C_{MAN}}$, preferably developed as described below.

a. Computation of Manual Commanded Flight Path Angle, $\gamma_{C_{MAN}}$

Referring to FIG. 4, the manual commanded flight path angle $\gamma_{C_{MAN}}$ is preferably formed from the pilot column commanded flight path angle rate $\dot{\gamma}_C$ as processed in component 61. Within component 61, the pilot's control column command signal $\delta_C$ is first normalized at component 70 so that maximum column deflection represents a unity input. The normalized command signal is then passed through a small deadzone at component 72 to assure a zero signal output when the pilot is not actually moving the column 55. The output of component 72 is connected to a switch 74 having two positions. The first position is triggered by a column push, i.e., a negative column command signal, $\delta_C$<0. The second switch position is triggered by a column pull, i.e., a positive column command signal, $\delta_C$>0. In the switch 74 first position, the output of component 72 is scaled by a pitch down manuever authority gain, $K_{PDA}$ at component 76. The gain $K_{PDA}$ is selected equal to a value corresponding to the nose down $n_{Z_{AUTH}}$ limit. Gain $K_{PDA}$ preferably equals approximately 1.0. Other amounts may be used depending on the desired incremental nose down command authority.

In the switch 74 second position, the output of component 72 is scaled by a pitch up manuever authority gain, $K_{PUA}$. As background information, an aircraft can develop lift at maximum lift coefficient that is proportional to the square of airspeed. At stall speed, the aircraft can develop a maximum lift that is equal to the weight of the airplane (i.e., for a 1 g stall). At higher speeds, the airplane can develop a maximum loadfactor equal to the ratio of the square of airspeed, $V^2$, over the square of stall speed, $V^2_{STALL}$. The incremental load factor capability of the airplane is thus:

$$\Delta n_{Z_{CAP}} = \frac{V^2}{V_{STALL}^2} - 1 \qquad (30)$$

This relationship may be used to match the maneuver command authority with the column displacement at low speeds in order to avoid deadzones in the high end of the control column input range. This relationship may also be used to limit the absolute incremental $n_Z$ command at higher speeds.

In the second position, the output of component 72 is scaled by the pitch up maneuver authority gain, $K_{PUA}$, that is an output of a circuit 75 to yield a maneuver command $\Delta n_{Z_C} = (\delta_C \cdot K_{PUA})$. The signal $K_{PUA}$ is developed based on the above aerodynamic load factor capability:

$$K_{PUA} = \frac{V^2}{V_{STALL}^2} - 1 \qquad (31)$$

Thus, a full-scale nose up column input ($\delta_C=1$) will produce an incremental load factor command equal to:

$$\Delta n_{z_C} = \frac{V^2}{V_{STALL}^2} - 1 \qquad (32)$$

This maneuver authority is limited by the limit value of $K_{PUA}$, preferably in the amount of 1.5, applied in circuit 75. For a limit value of $K_{PUA}=1.5$, the pilot will be able to command a limit incremental load factor $\Delta n_Z=1.5$ when $V>1.58 \cdot V_{STALL}$. For $V<1.58 \cdot V_{STALL}$, a full column input will command the maximum achievable lift coefficient.

Still referring to item 61 in FIG. 4, the outputs of components 76 and 78 are provided as inputs to combiner 80 and then scaled by the gravity constant g at component 82. The resulting scaled output signal 84 represents the conditioned form of a vertical acceleration command signal. Normalization of signal 84 into the commanded flight path angle rate signal $\dot{\gamma}_C$ is accomplished by dividing by groundspeed $V_G$ at divisor 86.

Still referring to FIG. 4, the signal $\dot{\gamma}_C$ from the output of processing circuit 61 is preferably prefiltered at component 59 so that the flight path angle command display $\gamma_{C_{DISPLAY}}$ on the electronic attitude indicator equipment will respond in harmony with actual pitch altitude of the aircraft. The signal $\gamma_{C_{DISPLAY}}$ is shown in FIG. 4 as an output from command integrator 60. Combiner 58 subtracts a $\dot{\gamma}_{C_{MOD}}$ signal developed at the output of block 56 from the prefiltered pilot column commanded flight path angle rate $\dot{\gamma}_C$. The signal $\dot{\gamma}_{C_{MOD}}$ from the output of block 56 closes a feedback loop around the flight path angle command integrator for cases when $(\gamma_C - \gamma_{MAX}) > 0$ and when $(\gamma_C - \gamma_{MIN}) < 0$, to provide speed stability for these conditions. The signal $\dot{\gamma}_{C_{MOD}}$ is developed as follows.

The flight path angle error $\gamma_\epsilon$ from the output of summer 20' (see FIG. 3) and the current non-dimensionalized longitudinal acceleration $\dot{V}/g$ are provided as inputs to a combiner 40. The output of combiner 40 is the difference between these values, which is then provided to combiners 42 and 44. At combiner 42, the difference signal $(\gamma_C - \gamma_{MIN})$ is formed by subtracting the signal $(T_{MIN}-T)/W$ from the output signal of combiner 40. At combiner 44, the difference signal $(\gamma_C - \gamma_{MAX})$ is formed by subtracting the signal $(T_{MAX}-T)/W$ from the output signal of combiner 40. Switches 46 and 48 are available so that during manual throttle operation, the signals $(T_{MIN}-T)/W$ and $(T_{MAX}-T)/W$ may be omitted.

The resulting output differences computed at combiners 42 and 44 are representative of the amount of flight path angle that is either above or below the sustainable the flight path angle for the maximum or minimum throttle limit, respectively. Therefore, a positive output signal at combiner 44 indicates that $(\gamma_C - \gamma_{MAX})$ is positive, representing a pitch up situation. A negative output signal at combiner 42 indicates that $(\gamma_C - \gamma_{MIN})$ is negative, representing a pitch down situation.

A diode function 50 is arranged so that only when $\gamma_C - \gamma_{MAX}$ is positive will this signal pass through to a combiner 54. Likewise, diode function 52 is arranged to provide the output of combiner 44 when the signal representative of $(\gamma_C - \gamma_{MIN})$ is negative. For all other cases, the output of a combiner 54, which sums the outputs of diodes 50 and 52, is zero, leaving the commanded flight path angle $\gamma_C$ to be developed by pure integration of the control column input signal. The resulting output of combiner 54 is then multiplied by gain $K_S$ at component 56 and inputted to the combiner 58. Thus, only when $\gamma_C > \gamma_{MAX}$ or when $\gamma_C < \gamma_{MIN}$ is the loop closed around the integrator 60, changing the end-to-end function into the pseudo integrator.

The output of combiner 58 is integrated at component 60 to form an inertially-referenced flight path angle command $\gamma_{CI}$. As shown in FIG. 4, it is preferred that this output $\gamma_{CI}$ be converted from an inertial quantity to the equivalent airmass quantity so as to more precisely compute the final TEC thrust command. This is accomplished by multiplying the output $\gamma_{CI}$ by the term $V_G/V_T$ at multiplier 62. The term $V_G$ is the current aircraft ground speed, and the term $V_T$ is the current aircraft true airspeed (i.e., airmass referenced speed.)

b. Manual Mode Response Shaping

The manual commanded flight path angle $\gamma_{C_{MAN}}$ signal, developed as described above, may be used as the sole commanded angle input into the basic TEC system of FIG. 3. It is likely, however, that the resulting aircraft response will be considered too sluggish during manual operation. In order to achieve U.S. Regulatory Level I handling qualities, it is preferable that additional feed-forward paths are employed to further shape the manual flight path angle control responses.

In particular and referring to FIG. 4, a feed-forward pitch rate command path is formed based on the consideration that a constant control column input (i.e., a constant g maneuver) at constant speed requires a steady state pitch rate equal to the rate of change of flight path angle. Therefore, the commanded flight path angle rate signal $\dot{\gamma}_C$ is scaled by a gain KGDP at component 90, differentiated at component 92, and provided as an input into an elevator integral control signal path at combiner 94.

The differentiation and integration within the TECS core algorithm basically cancel each other, so that this signal path provides, in essence, the desired direct elevator command proportional to the control column input. This implementation allows the $V_{MIN}/V_{MAX}$ protection modes, the processing of which is represented by box 34 in FIG. 3 to fully override the pilot's input and prevent airplane stall or overspeed. The gain KGDP is preferably computed so that the overall throughput gain from $\dot{\gamma}_C$ to the elevator command is equal to the pitch rate feedback gain. This signal path therefore shapes the quickness of the maneuver initiation and its termination.

To control the lag of the actual flight path angle response $\gamma$ relative to the flight path angle command $\dot{\gamma}_{C_{MAN}}$, the commanded flight path angle rate signal $\dot{\gamma}_C$ is independently scaled by gains KGEE and KGET at components 96 and 98, respectively. The resulting signal (KGEE)($\dot{\gamma}_C$) is provided as an input to the combiner 94 where it is added to the differentiated signal (KGDP)($\dot{\gamma}_C$) from block 92. Their combination results in formation of a manual feed-forward control signal, MANUAL F.F. CONTROL, which is inputted to the elevator command processing signal control signal path at combiner 18' in FIG. 3.

Likewise, the resulting signal from block 98 represents (KGET)($\dot{\gamma}_C$) and is labeled TF.F.COMMAND. The signal TF.F.COMMAND is representative of a feed forward thrust rate command signal which is provided as an input to the thrust command processing signal path at combiner 20' in FIG. 3.

During a constant control column input maneuver, these signals (TF.F.COMMAND) and (KGEE·$\dot{\gamma}_C$), provide an integration bias with which to control the flight path angle error magnitude that will be established. The growth rate of the thrust and pitch attitude command must be in harmony with the rate of change of flight path angle, and result from the total input to the thrust and elevator command integrators. For higher gains KGET and KDEE, the steady state flight path angle error during a constant g maneuver will be smaller, and since the magnitude of the flight path angle error is proportional to the response lag, these gains determine in effect the response lag of flight path angle relative to flight path angle command. To achieve a desired response lag, the gains KGEE and KGET are computed from the following equations that relate the needed rise rate in thrust command and pitch attitude (or angle of attack) for a given rate of change of flight path angle command to the needed magnitude of the integration bias.

Figure 5:
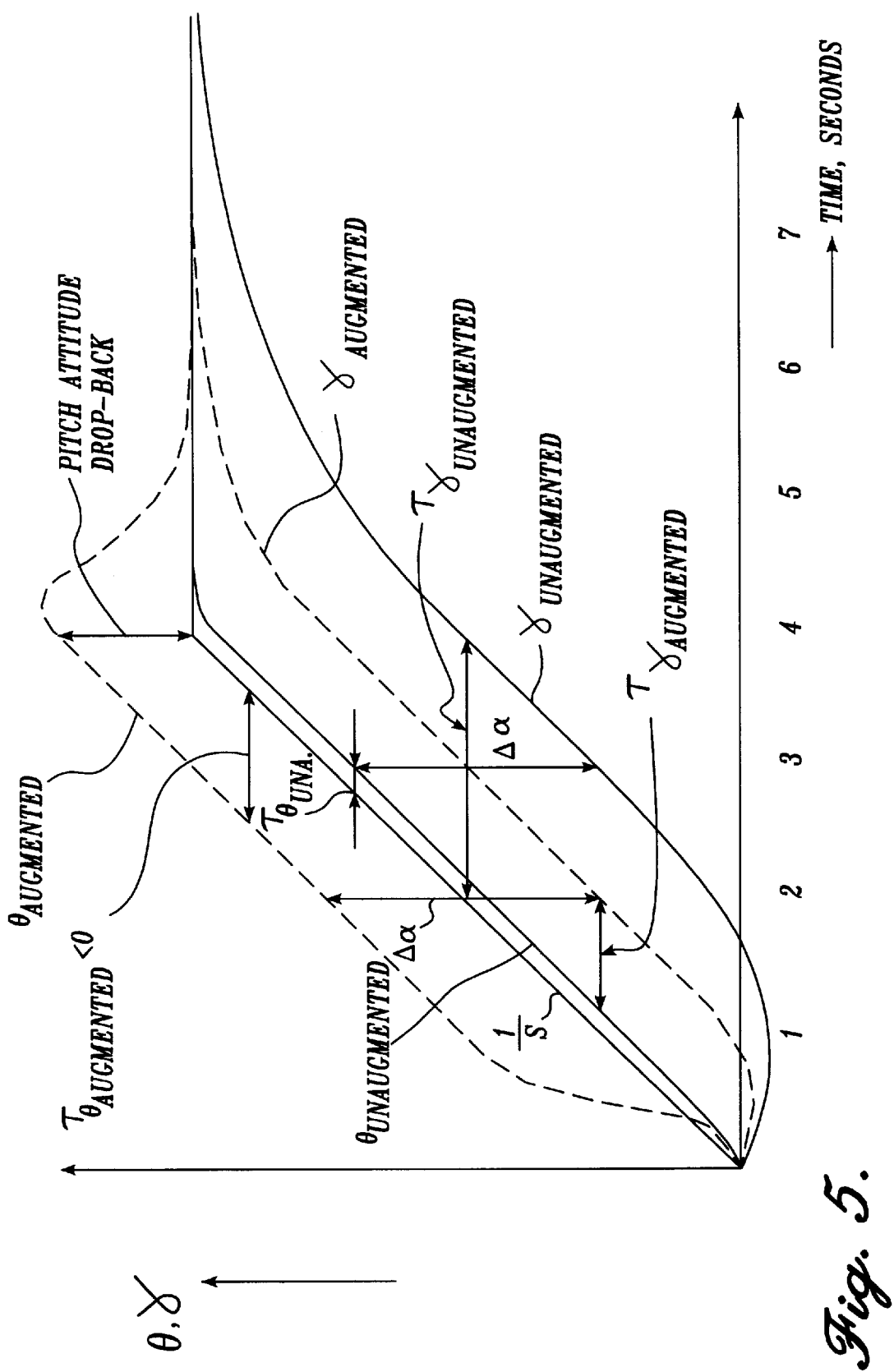
FIG. 5 is a plot of possible relative response characteristics of the variables $\gamma$, $\gamma_C$, $\theta$ and $\Delta\alpha$, including the response characteristics of the improved TEC system described in FIGS. 3 and 4, showing the reduced response lag of augmented flight path angle $\gamma_{Augmented}$ relative to commanded flight path angle $\gamma_C$ when compared to the response lag of the unaugmented flight path angle $\gamma_{Unaugmented}$.

Referring to FIG. 5, for a constant column input, the ideal response of the flight path angle $\gamma$ is parallel relative to the flight path angle command $\gamma_C$. The flight path angle error $\gamma_\epsilon$ then equals the product of the response lag $\tau_\gamma$ times the rate of change of flight path angle $\dot{\gamma}$:

$$\gamma_\epsilon \tau_\gamma \dot{\gamma}_C = \tau_\gamma \dot{\gamma} \quad (33)$$

For this situation, physics dictates that the thrust command needs to rise at a rate of:

$$\Delta T_C \text{ per second} = \dot{\gamma} W \quad (34)$$

where W is aircraft weight. Further, this thrust command rise must be produced by the control law shown in FIG. 3:

$$\Delta T_C \text{ per second} = \{(\gamma_\epsilon + KGET \cdot \dot{\gamma}_C) \cdot KTI - KTP \cdot \dot{\gamma}\} W \quad (35)$$

Equating (34) and (35), substituting (33), and solving for KGET yields:

$$KGET = \frac{1 + KTP}{KTI} - \tau_\gamma \quad (36)$$

Likewise, as shown in FIG. 5, in the elevator control loop the control law must produce a rising attitude command of:

$$\Delta \theta_C \text{ per second} = \dot{\gamma}_C = \dot{\gamma} \quad (37)$$

Thus, $$(\gamma_\epsilon + KGEE \cdot \dot{\gamma}_C)KEI + KEP \cdot \dot{\gamma} = \dot{\gamma} \quad (38)$$

Again substituting $\gamma_\epsilon$ using equation (33) and solving for KGEE yields:

$$KGEE = \frac{1 - KEP}{KEI} - \tau_\gamma$$

This way the responses can be shaped to match ideal linear overshoot/undershoot free responses. By calculating the feed-forward gains using the above formulas, the resulting responses conform to the desired responses for the selected $\tau_\gamma$, without further tuning, assuming the system feedback gains have been designed properly.

A designer should consider, however, that the response time constant cannot be selected arbitrarily small without impacting the handling quality adversely. The pitch attitude response equals the sum of flight path angle and angle of attack. A constant g maneuver requires a proportional incremental angle of attack. Therefore, the shorter the selected flight path angle response lag, the more pitch attitude will start to lead the flight path angle command. This may result in an initial pitch rate overshoot and a final attitude drop back, shown in FIG. 5 by the response traces labeled "AUGMENTED". This may present a handling qualities problem at low speeds and low lift slope gradients, depending on the specific airplane characteristics. Typically, for the Boeing fleet of subsonic transports an acceptable design compromise for the response lag is $\tau_\gamma \approx 1$ second for final approach flight conditions.

As will be appreciated by those skilled in the art, there are numerous advantages in using the present invention improved TEC system. In particular, the above-described present invention TECS speed stability implementation scheme is completely integrated with the basic TEC system to provide a seamless transition between automatic speed control when autothrust is in effect and conventional speed stability when thrust is limited or the autothrust function is off (i.e., manual thrust active.) By adding to the already existing basic TECS functions, the present invention provides fully integrated response without creating duplicate design elements for manual and automatic control, and thus avoids the need for complex specialized logic.

An added advantage of the present invention speed stability approach is that there will be only one speed reference in the system, which is indicated on the mode control panel at all times. This avoids design ambiguity. This speed reference may be modified by the speed knob on the mode control panel or by the pitch trim button on the control column wheel.

Another benefit of the present invention is the elimination of the need for a flare bias derived as a function of radio altitude. During flare under the present invention TECS algorithm, it is possible to select $K_S$ such that a healthy pull-back is required by the pilot, similar to the force required in conventional unaugmented systems. The present invention also provides column displacement limit matching to desired command g-maneuver authority and stickforce per g characteristics. In addition, the general response shape of the present invention is unaffected by the flight condition, without requiring further gain scheduling of the response lag. This provides uniform handling qualities throughout the flight envelope and especially standardized control responses between automatic and manual flight path modes.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a method of flight control in which a thrust command is computed based on a total aircraft energy error relative to flight path and speed control commands, and an elevator command is computed based on an energy distribution error relative to the same flight path and speed control commands, the improvement comprising:

computing an elevator control command in response to a control column input by the pilot; the computing including:
(a) establishing in the short term a change in flight path angle beyond the sustainable flight path angle at the trim speed for the prevailing constant thrust condition; and
(b) establishing in the long term a change in speed relative to a set reference speed, the speed change being proportional to the column control input, and a flight path angle equal to a sustainable value for the prevailing constant thrust condition and the altered speed condition.

2. The improvement according to claim 1, wherein computing includes calculating a flight path angle command signal; the flight path angle command being used only during a condition when the computed thrust command is at a preset upper or lower thrust limit or when a throttle servo is disengaged; the flight path angle command being developed by pure integration of a signal representative of the pilot's control column input when the computed thrust command is within the range between the preset upper and lower thrust limits.

3. The improvement according to claim 1, wherein the total aircraft energy error is computed from a signal representative of the total energy rate error $\dot{E}_{Se}$, the total energy rate error being formed as the sum of a signal representative of the flight path angle error $\gamma_\epsilon$ relative to the flight path angle command and a signal representative of an acceleration error $\dot{V}_\epsilon$ relative to a longitudinal acceleration command.

4. The improvement according to claim 1, wherein the total energy distribution error is computed from a signal representative of the total energy distribution rate error $\dot{D}_\epsilon$, the total energy distribution rate error being formed as the difference between a signal representative of a flight path angle error $\gamma_\epsilon$ relative to the flight path angle command and a signal representative of an acceleration error $\dot{V}_\epsilon$ relative to a longitudinal acceleration command.

5. The improvement according to claim 1, wherein the elevator control command is a function of a signal representative of a flight path angle error signal $\gamma_\epsilon$; wherein the flight path angle error signal is formed as a difference between the current flight path angle $\gamma$ and a manual commanded flight path angle $\gamma_{C_{MAN}}$, the $\gamma_{C_{MAN}}$ signal being formed at the output of an integrator which includes an input of a flight path angle rate command signal $\dot{\gamma}_C$ which is proportional to the control column input.

6. The improvement according to claim 5, wherein the flight path angle rate command signal $\dot{\gamma}_C$ is a function of a signal $\delta_C$ representative of a control column displacement multiplied by an incremental load factor $\Delta n_Z$ for a positive control column input.

7. The improvement according to claim 6, wherein the incremental load factor $\Delta n_Z$ is a function of airspeed V and airspeed at a 1 g stall $V_{STALL}$ in the relation $$\Delta n_z = \left\{ \frac{V^2}{V_{STALL}^2} - 1 \right\}.$$

8. The improvement according to claim 7, wherein the incremental load factor $\Delta n_Z$ is limited on the low side to a value greater than or equal to zero, and is limited on the high side to a pre-selected value representative of the maximum allowable positive incremental load factor.

9. The improvement according to claim 5, wherein the flight path angle rate command signal $\dot{\gamma}_C$ is a function of a signal $\delta_C$ representative of a control column displacement multiplied by the ratio of gravity g to groundspeed $V_G$.

10. The improvement according to claim 5, wherein a second input to the integrator is a signal $\gamma_{C_{MOD}}$ provided when the thrust command is at an upper or lower limit;

when the thrust command is at the upper limit, the signal $\gamma_{C_{MOD}}$ being a function of the flight path angle error signal $\gamma_\epsilon$, current longitudinal acceleration, and a ratio of thrust margin relative to the upper thrust limit over the weight of the aircraft, when the thrust command is at the lower limit, the signal $\gamma_{C_{MOD}}$ being a function of the flight path angle error signal $\gamma_\epsilon$, current longitudinal acceleration, and a ratio of thrust margin relative to the lower thrust limit over the weight of the aircraft, and for all other conditions the signal $\gamma_{C_{MOD}}$ being zero.

11. The improvement according to claim 1, wherein the elevator control command is computed as a function of a signal representative of a flight path angle error signal $\gamma_\epsilon$; the flight path angle error signal $\gamma_\epsilon$ being formed as a difference between the current flight path angle $\gamma$ and a manual commanded flight path angle $\gamma_{C_{MAN}}$; wherein the $\gamma_{C_{MAN}}$ signal is formed at the output of an integrator which has two inputs, a first input being a flight path angle rate command signal $\dot{\gamma}_C$ which is proportional to the control column input and a second input being a short term adjustment signal $\gamma_{C_{MOD}}$ available when the thrust command is at an upper or lower limit.

12. The improvement according to claim 11, wherein the manual flight path angle command signal $\gamma_{C_{MAN}}$ is an airmass referenced value, a corresponding inertially referenced value being used for display to the pilot on a cockpit instrument display.

13. The improvement according to claim 1, wherein during manual flight control the total aircraft energy error is computed from a signal representative of the total energy rate error $\dot{E}_{Se}$, the total energy rate error being formed as a combination of a signal representative of the flight path angle error $\gamma_\epsilon$, a signal representative of an acceleration error $\dot{V}_\epsilon$, and the flight path angle rate command signal $\dot{\gamma}_C$ multiplied by a gain KGET; and wherein during manual control flight the total energy distribution error is computed from a signal representative of the total energy distribution rate error $\dot{D}_\epsilon$, the total energy distribution rate error being formed as a combination of a signal representative of a flight path angle error $\gamma_\epsilon$, a signal representative of an acceleration error $\dot{V}_\epsilon$, the flight path angle rate command signal $\dot{\gamma}_C$ multiplied by a gain KGEE, and the flight path angle rate command signal $\dot{\gamma}_C$ multiplied by a gain KGDP and differentiated.

14. The improvement according to claim 13, wherein the gains KGET and KGEE are determined to yield a pre-selected steady state response lag of flight path angle relative to said flight path angle command for a pilot's stick or column ($\delta_C$) input, for a condition where thrust command remains within the range of the minimum and maximum thrust limit.

15. The improvement according to claim 14, wherein the gain factor KGEP is determined such that an overall throughput gain of the flight path angle rate command signal to the elevator in the signal path including KGEP is approximately equal to a pitch rate feed feedback gain to the elevator command, so that the signal path including KGEP effectively serves as the pitch rate command signal.

16. In a method of flight control in which a thrust command is computed based on a total aircraft energy rate error $\dot{E}_{S\epsilon}$ and an elevator command is computed based on an energy distribution rate error $\dot{D}_e$, the improvement comprising computing an elevator control command in response to a control column input by the pilot; the computing including:

(a) computing the energy distribution rate error as a function of an acceleration error, a current flight path angle $\gamma$, and a manual commanded flight path angle $\gamma_{C_{MAN}}$; the $\gamma_{C_{MAN}}$ signal initially being in excess of the sustainable flight path angle established for the prevailing thrust condition by an amount proportional to the column input; and (b) processing the $\gamma_{C_{MAN}}$ signal so that the amount of $\gamma_{C_{MAN}}$ in excess of the sustainable flight path angle for the prevailing thrust condition and an altered speed condition is eventually eliminated, with the aircraft establishing a change in speed relative to a set reference speed, the speed change being proportional to the column input.

17. The improvement according to claim 16, wherein the set reference speed can be set and displayed via a cockpit mode control panel.

18. The improvement according to claim 16, wherein the pilot is able to change the set reference speed of the airplane via a pitch trim switch on the control column.

* * * * *